United States Patent
Kuroki et al.

(10) Patent No.: US 7,043,924 B2
(45) Date of Patent: May 16, 2006

(54) TURBINE POWER PLANT, INSTALLATION PROCESS AND REMOVAL PROCESS OF THE TURBINE POWER PLANT

(75) Inventors: Hidetoshi Kuroki, Hitachi (JP); Isao Takehara, Hitachi (JP); Yasuyuki Watanabe, Hitachi (JP); Seisaku Takihana, Tokai (JP)

(73) Assignee: Hitachi, Ltd., Tokyo (JP)

( * ) Notice: Subject to any disclaimer, the term of this patent is extended or adjusted under 35 U.S.C. 154(b) by 388 days.

(21) Appl. No.: 10/081,202

(22) Filed: Feb. 25, 2002

(65) Prior Publication Data

US 2003/0061819 A1   Apr. 3, 2003

(30) Foreign Application Priority Data

Oct. 2, 2001   (JP) ............................. 2001-305919

(51) Int. Cl.
*F02C 7/20* (2006.01)

(52) U.S. Cl. ........................................... 60/796
(58) Field of Classification Search ............... 60/796; 290/1 A, 1 R
See application file for complete search history.

(56) References Cited

U.S. PATENT DOCUMENTS

| | | | |
|---|---|---|---|
| 2,789,234 A * | 4/1957 | Lambert et al. ............ 290/1 R |
| 2,799,782 A * | 7/1957 | Armstrong et al. ............ 290/1 |
| 3,369,684 A * | 2/1968 | Ford ........................ 214/515 |
| 3,418,485 A * | 12/1968 | Anderson et al. ............. 290/1 |
| 3,714,449 A * | 1/1973 | De Bella ..................... 290/1 |
| 3,785,514 A * | 1/1974 | Forsyth et al. ............ 214/38 R |
| 3,908,784 A * | 9/1975 | Blurton et al. ............. 180/119 |
| 5,033,269 A * | 7/1991 | Smith ........................ 60/607 |
| 5,841,147 A * | 11/1998 | Steinke et al. ........... 250/507.1 |
| 6,250,080 B1 * | 6/2001 | Shelor et al. ................. 60/618 |
| 6,449,957 B1 * | 9/2002 | Takamatsu et al. ........... 60/796 |

FOREIGN PATENT DOCUMENTS

| | | | |
|---|---|---|---|
| JP | 08-200092 | * | 8/1996 |
| JP | 11-13416 | | 1/1999 |
| JP | 11-013416 | * | 1/1999 |
| JP | 11-62621 | | 3/1999 |
| JP | 2001-173408 | * | 6/2001 |

* cited by examiner

*Primary Examiner*—Charles G. Freay
(74) *Attorney, Agent, or Firm*—Mattingly, Stanger & Malur, P.C.

(57) ABSTRACT

A turbine power plant includes power generation apparatuses divided into a plurality of modules, a common base mounting thereon the power generation apparatuses and a supporting apparatus for supporting the common base. The common base is constructed so as to be commonly used as a part of a transportation vehicle and as a frame of the power plant.

5 Claims, 8 Drawing Sheets

TURBINE POWER PLANT, INSTALLATION PROCESS AND REMOVAL PROCESS OF THE TURBINE POWER PLANT

BACKGROUND OF THE INVENTION

1. Technical Field of the Invention

The present invention relates to a turbine power plant, a process of installing the turbine power plant and a process of removing the turbine power plant installed at the site.

2. Description of Prior Arts

Prior arts that aim to reduce a term of work for installation of a turbine power plant at the site are disclosed, for example, in JP A 11-62621, JP A 2001-173408 and JP A 11-13416.

The above prior art, JP A 11-62621 discloses that auxiliary equipments such as a starting apparatus, lubrication oil apparatus, control oil apparatus and lubrication oil tank are made in units, and the units are integrated with a gas turbine unit and arranged in a building.

The above prior art, JP A 2001-173408 discloses that apparatuses such as a turbine, generator, and so on and a frame made of steel are integrated and fixed into a module, and the module is transported to a building which is an installation place by a means of transportation, and installed on a foundation frame provided in the building through an elastic support apparatus and vibration-proof support apparatus.

The prior art JP A 11-13416 discloses a package type power plant that a support frame is made as a steel framework steel plate formed of steel framework shaft set and steel panels, a gas turbine, a generator and a steam turbine are supported on the steel framework steel plate frame, and auxiliary apparatuses and piping of a control oil system, lubrication oil system and cooling water system of the gas turbine, generator and steam turbine, and electric machine instruments are contained in an interior space of the steel framework steel plate frame.

In the above-mentioned prior arts, it is disclosed that power generation apparatuses such as the gas turbine, steam turbine, generator, and so on and the frame mounting thereon those power generation apparatuses are formed so as to be one block and transported to the installation site. However, in the case where they can not be transported by integrating them into one block because of problems of the scale of the power plant, and so on, it is necessary that the power generation apparatuses are divided plural parts and transported to the installation site, civil engineering and construction work are conducted at the installation location to form a concrete foundation frame at the site, and the power generation apparatuses individually transported are mounted on the concrete foundation frame and assembled. Therefore, a term of installation work of the power plant becomes long.

Further, basically, the power plant is installed considering everlasting use, so that complicated and troublesome disassembling works are necessary when the power plant once installed is moved to another place.

SUMMARY OF THE INVENTION

The present invention is made in view of the above-mentioned problem, and an object of the invention is to provide a turbine power plant that an installation process thereof at the site is simplified and the once installed power plant can be easily moved to another site.

In order to achieve the above object, a turbine power plant of the present invention comprises power generation apparatuses divided into a plurality of modules, a common base mounting thereon the power generation apparatuses and a supporting apparatus for supporting the common base, and the common base is constructed so that the common base is used commonly as a part of a transportation vehicle and a support frame of the power plant.

DESCRIPTION OF EMBODIMENTS OF THE INVENTION

Figure 1A:
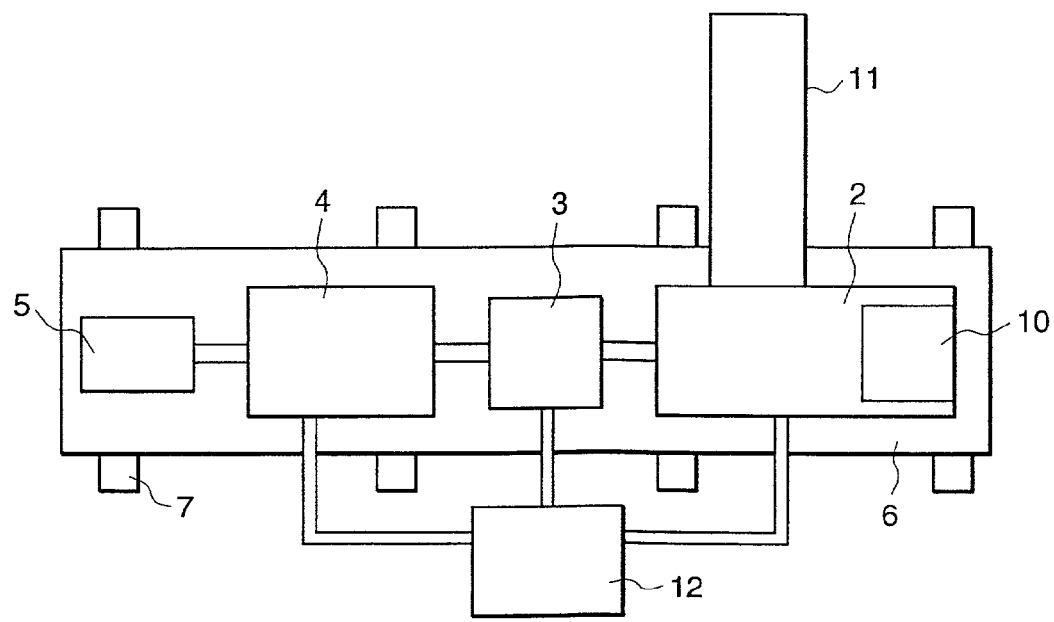
FIG. 1(a) is a plane view of the whole construction of a gas turbine power plant relating to an embodiment of the present invention.

Embodiments of the present invention will be described hereunder in detail, referring to the drawings. In the following explanation, a gas turbine power plant is taken as an example and described thereabout, however, the present invention can be applied to a power plant using a steam turbine, a diesel engine or the like.

Figure 1B:
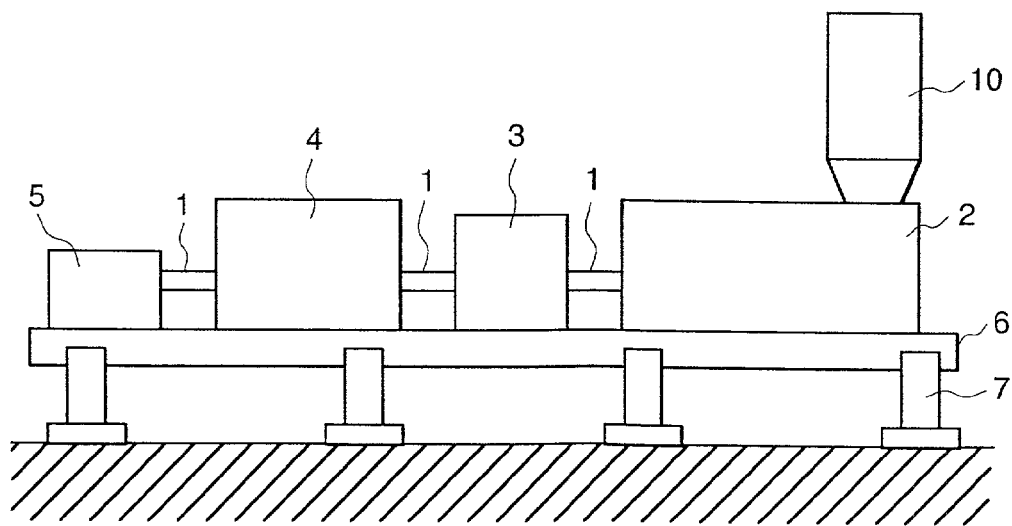
FIG. 1(b) is a side view of the gas turbine power plant of FIG. 1(a).

FIGS. 1(a) and 1(b) show an operational condition of a power plant which is an embodiment of the present invention. FIG. 1(a) is a plan view of the power plant, viewed from above, and FIG. 1(b) is a side view of the power plant shown in FIG. 1(a).

The power plant of the embodiment has a gas turbine 2, a reduction gear 3, a generator 4 and a starting apparatus 5, connected to each other by a rotating shaft 1 and each fixed on a common base 6. The gas turbine 2 is provided with a suction duct 11 connected thereto for supplying suction air to the gas turbine 2 and an exhaust duct 10 connected thereto for exhausting exhaust gas from the gas turbine 2 to outside. In the present embodiment, the exhaust duct 10 is installed on an upper portion of the gas turbine 2, and the suction duct 11 is installed on a ground adjacent to the gas turbine 2 and arranged so that one end of the suction duct 11 is connected to a suction port of the gas turbine 2. In the present embodiment, a lubrication oil tank/auxiliary equipment package 12 is provided at a position adjacent to the common base 6 on an opposite side to the above-mentioned suction duct 11. The lubrication oil tank/auxiliary equipment package 12 is connected mutually to the gas turbine 2, reduction gear 3, generator 4, an so on so that lubrication oil is supplied to them. The exhaust duct 10, suction duct 11 and lubrication oil/auxiliary equipment package 12 are arranged and connected after the gas turbine 2, reduction gear 3, generator 4 and starting apparatus 5 are installed on the common base 6, however, the arrangement and connection order is not limited to this order.

The common base 6 is supported on the ground by a plurality of landing gears or supports 7. The common base 6 is manufactured by fixing H-shaped steel and steel plate by welding or fasteners such as bolts. The common base 6 can be made in a lighter-weight and higher-rigidity construction by using steel pipes instead of the H-shaped steel and steel plate. Further, it is possible to reduce the weight of the common base 6 to be lower by using material of high specific strength such as aluminum alloy instead of steel.

In the present embodiment, the power plant that the gas turbine 2, reduction gear 3, generator 4, starting apparatus 5, and so on are connected by the rotating shaft 1 is constructed so as to be fixed on the common base 6. Hitherto, a vast term of works and cost were taken for manufacturing a concrete support frame installing thereon a power plant, however, in the present embodiment, the common base 6 is used instead of the concrete support frame, whereby the term of work and cost can be greatly reduced.

The landing gears 7 which support the common base 6 and serve as a height adjusting device adjustable of the height of the common base 6 are mounted on the sides or the bottom of the common base 6. The landing gears 7 support the weights of the common base 6 and the power plant on the common base 6, and the length thereof can be changed independently from each other by hydraulic power or the like. Thereby, the height of the common base 6 can be freely adjusted, and an installation surface of the common base 6 installing thereon the power plant can be kept horizontal.

Figure 2:
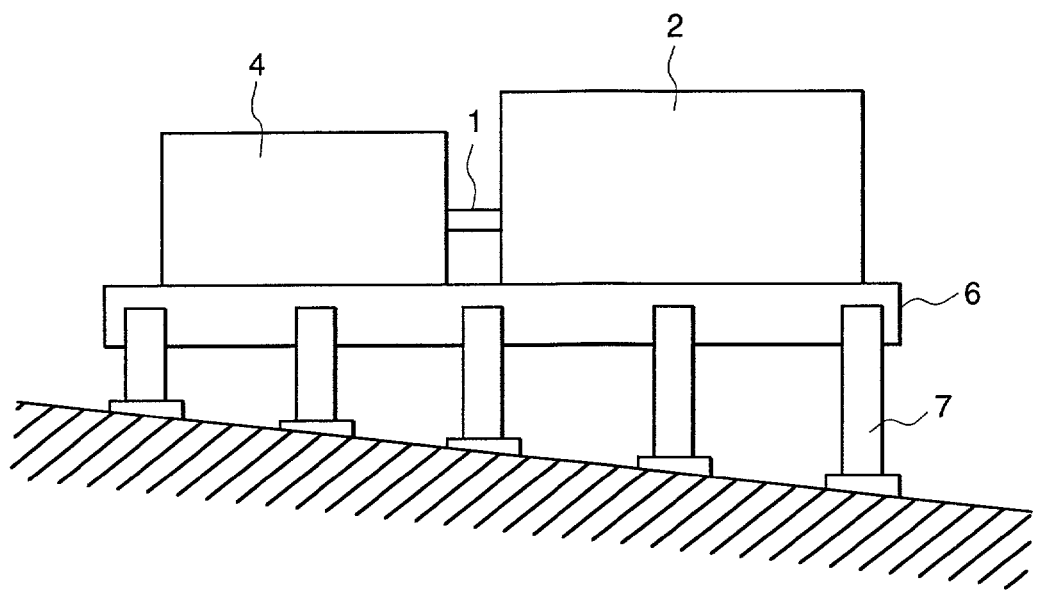
FIG. 2 is a side view of the gas turbine power plant installed on a slope.

FIG. 2 is a view showing an adjustment example of the height of the common base 6 by the landing gears 7. As shown in FIG. 2, the common base 6 and the power plant on the common base 6 can be kept horizontal even on the ground not horizontal such as an oblique ground surface by adjusting the height of the landing gears 7.

Figure 3:
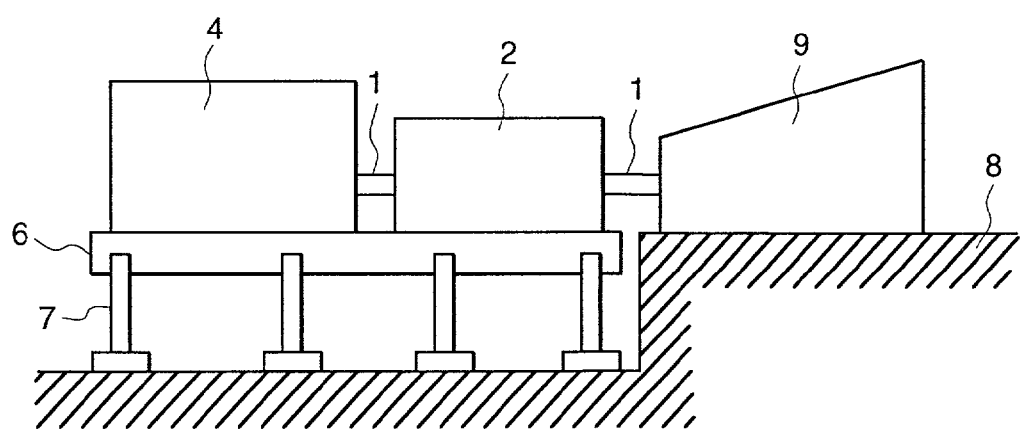
FIG. 3 is a side view of a power plant in which the gas turbine power plant is combined with a steam turbine installed on a concrete support frame.

FIG. 3 is a view showing an example of a construction in which the power plant is combined with a steam turbine equipment. In the embodiment shown in FIG. 1, the power plant has the gas turbine constructed therefor, and it is also possible to use the power plant by combining it with a steam turbine 9 or the like installed on a concrete support frame 8, by installing, as shown in FIG. 3, the power plant using the common base 6. That is, it is possible to install by combining the gas turbine and the steam turbine, by adjusting the landing gears 7 of the common base 6 so that the height of a rotating shaft of the steam turbine 9 installed on the concrete support frame 8 becomes the same as the height of the rotating shaft 1 of the gas turbine 2 installed on the common base 6.

Further, in the present embodiment, since the height of the landing gears 7 can be changed under the condition that the power plant is mounted on the common base 6, it is possible to make large a working space under the common base 6 by extending the landing gears 7 to raise the height of the common base 6 when maintenance is conducted. In the case of a conventional concrete support frame, it was spatially impossible for a work man to enter under the power generation apparatuses such as the gas turbine 2, and so on, however, in the present embodiment, it is possible for a work man to enter under the power generation apparatuses and conduct maintenance work, or the like. On the contrary, by lowering the height of the landing gears 7, the height of the power generation apparatuses is lowered, whereby it is possible to conduct maintenance work of an upper portion of the power generation apparatuses without building a large-scaled scaffolding, or the like.

Figure 4:
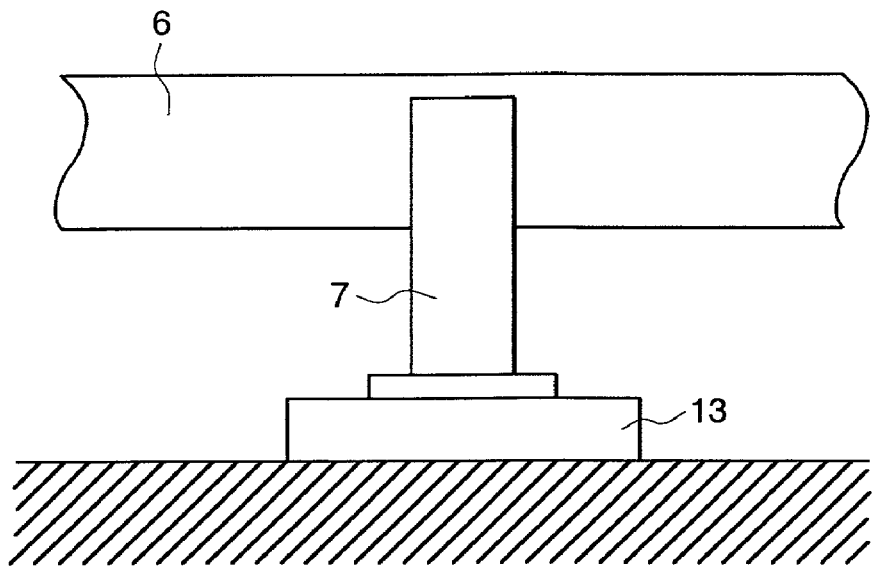
FIG. 4 is a side view of a part of the gas turbine power plant, showing a condition that a liner plate for adjusting a surface pressure is mounted between the ground and landing gears supporting a common base.
Figure 5:
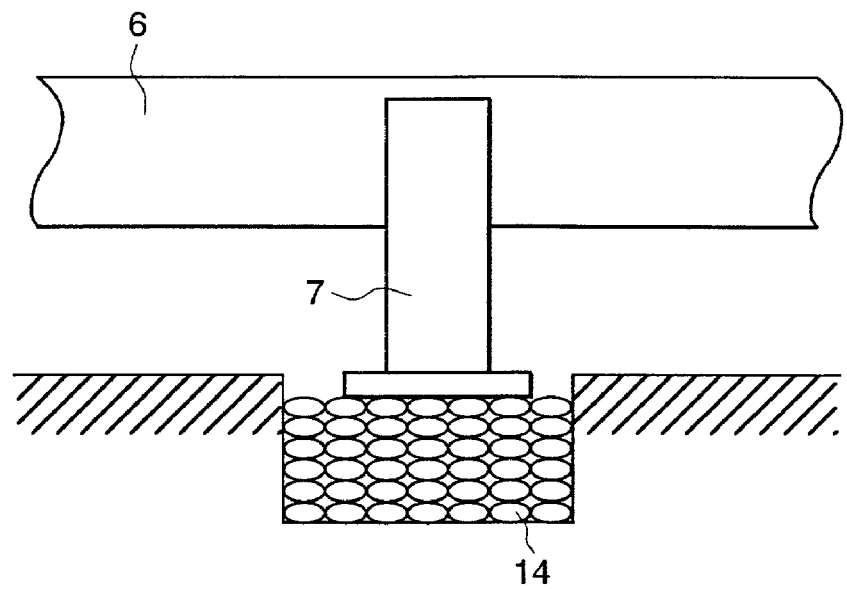
FIG. 5 is a side view of a part of the gas turbine power plant, showing a condition that a ground base of ground surface under the landing gears supporting the common base is reinforced.

FIG. 4 is a view showing a condition that a liner plate 13 is mounted between the landing gear 7 and the ground. FIG. 5 is a view of a reinforced ground foundation installing thereon the landing gear 7. A ground surface contacting with the landing gears 7 which support the common base 6 is unnecessary to be as strong as a conventional concrete support frame, and a construction of a contact ground portion between the landing gears 7 and the ground is changed according to the strength of the ground. The ground base is searched before installation of the landing gears 7 to obtain ground bearing stress N (allowable support stress of the ground). When a value F/A obtained by dividing a contact ground area A of the landing gear 7 by a load F applied on the landing gear 7 is smaller than the ground bearing force N, the landing gears are installed on the ground as they are. If when F/A is larger than N, the liner plate 13 having an installation area S is provided between the ground and the landing gear 7, as shown in FIG. 4. Here, S is a size satisfying F/A<N.

In another way as shown in FIG. 5, the ground is reinforced by digging down the ground around the contact ground portion of the landing gear 7 and laying pebbles 14 or the like so that the ground strength is F/A<N. Even in the case where a method of improving the ground strength is taken, the ground strength improvement is sufficient to be effected on only the ground close to the landing gears 7, so that it is remarkably simple as compared with building of a conventional concrete support frame and a term of work and cost are also sufficient to be relative short and relatively low, respectively.

Next, details at time of transportation and installation of the power plant of the present embodiment will be explained.

Figure 6:
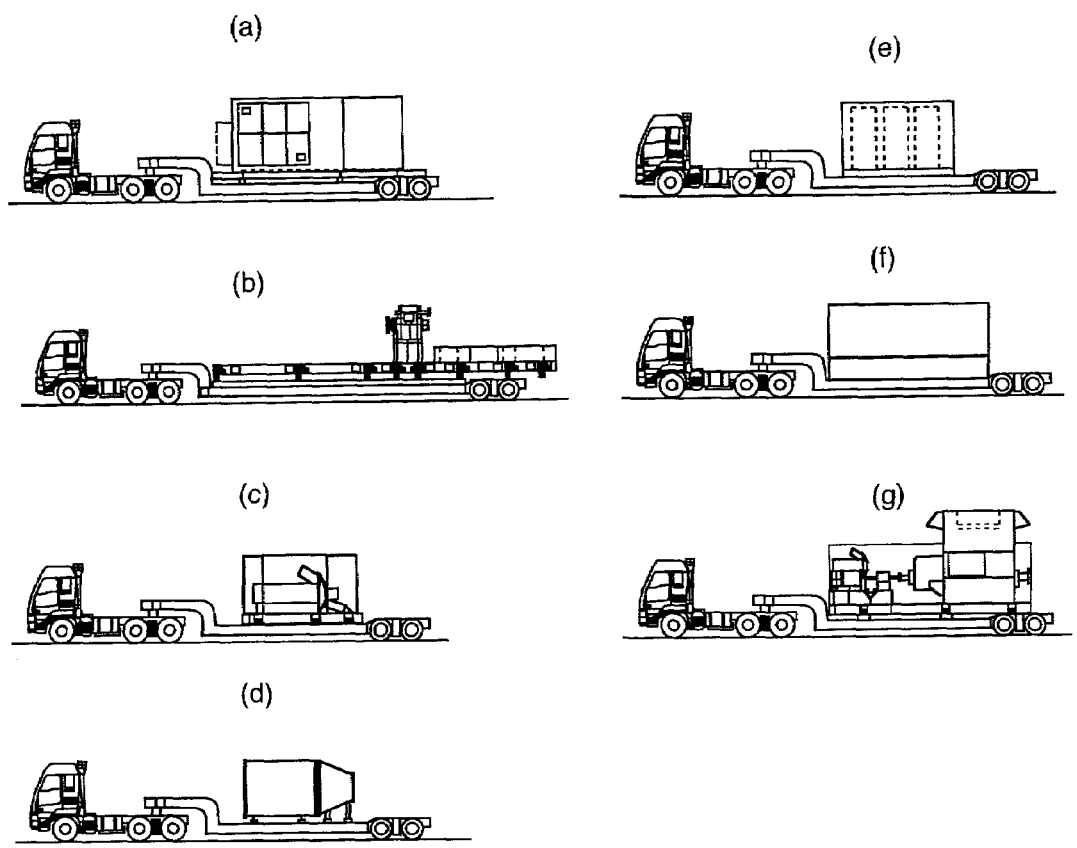
FIGS. 6(a) to (g) each are a view showing a condition that the common base and power plant to be transported are mounted on a trailer.

FIG. 6 is conditional views when the power plant is transported. In transportation, the turbine power plant is divided into a plurality of packages and transported because of restriction of transportation weight and transportation size. In FIG. 6, there are shown modules of (a) the suction duct, (b) the common base, (c) a gas turbine package, (d) the exhaust duct, (e) a control package, (f) the lubrication oil tank/auxiliary equipment package and (g) the generator and starting apparatus. By dividing the power plant into a plurality of packages, it is possible for transportation to use transportation vehicles such as trailers of a wide use. Use of the trailers of a wide use makes it possible to freely run on public roads under rule. Further, it is possible to load the packages in a ship together with the trailer or on an air plane.

Figure 7:
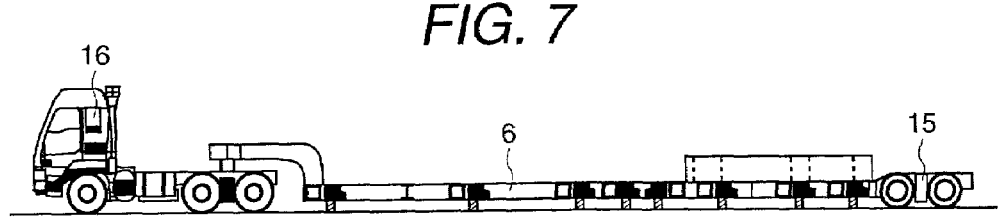
FIG. 7 is a side view of a construction in which the common base and transportation trailer are integrated.

FIG. 7 is a view of a construction in which a common base is integrated with a transportation trailer (a trailer bed). For the common base 6 of the present embodiment, it is possible to mount thereon the power plant made in package as mounting objects, and further it is possible to take a construction which is provided with a wheel portion 15 mounted on the common base itself as shown in FIG. 7 and runs as a vehicle body. In this case, after it reaches at the site and the common base 6 is installed, a driving portion 16 and the wheel portion 15 can be used for another use during operation of the power plant by constructing the driving portion 16 and the wheel portion 15 to be separable (detachable).

Figure 8:
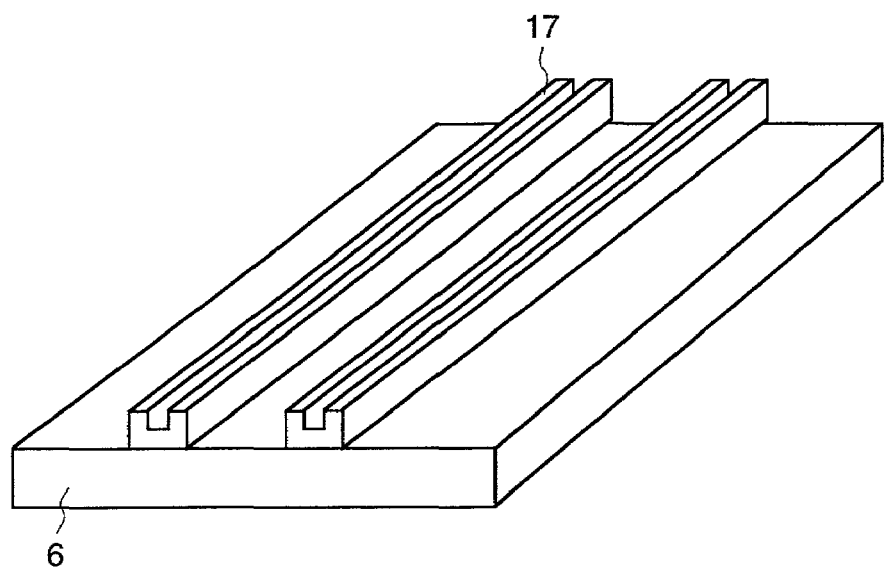
FIG. 8 is a perspective view of a common base provided with lengthwise rails.
Figure 9:
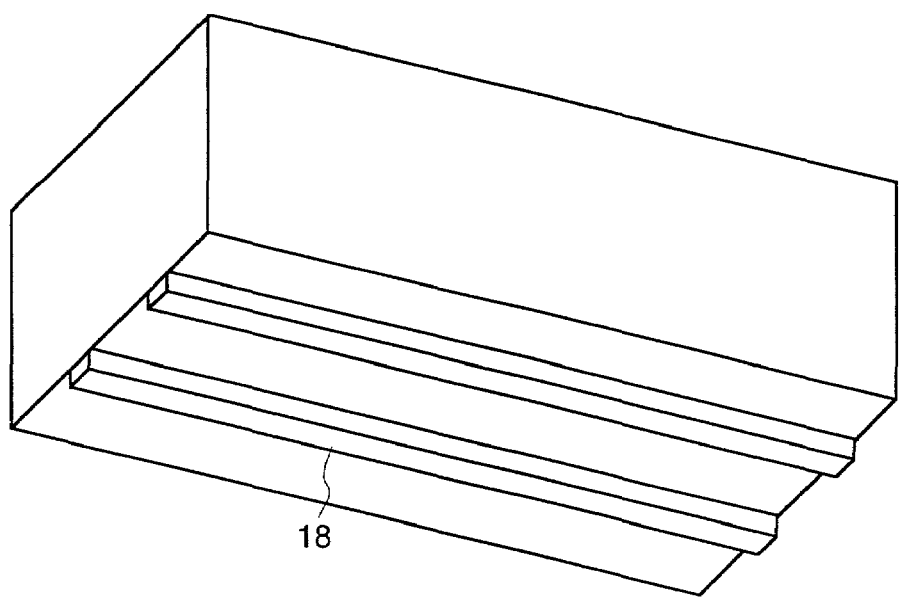
FIG. 9 is a perspective view of a power plant package provided with a slide for sliding on the common base in a length direction.

Further, it is also possible to mount the reduction gear 3, etc. which is another part of the power plant on the common base 6 to run during transportation. In the case where another part of the power plant is mounted on the common base 6 and runs, it may be necessary to mount it at a specific position such as a central portion of the common base 6 in view of balance of load. In this case, by having prepared a lengthwise rail 17 elongated in a length direction and mounted on the common base 6 as shown in FIG. 8, and, as shown in FIG. 9, by having prepared a lengthwise slide 18 which is mounted on a common base mounting surface side of the power plant which is mounted on the common base 6, for example, a convex mechanism which is able to be fitted in a concave of the lengthwise rail 17, the power plant is disposed in the central portion of the common base 6 during transportation, it is moved on the common base along the rail 17 when set at the site and can be positioned at a predetermined position of the common base 6.

Figure 10A:
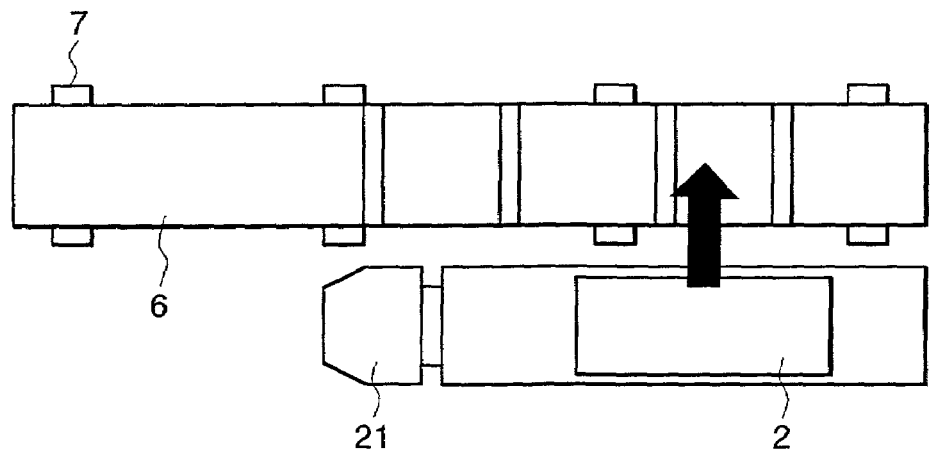
FIGS. 10(a) and 10(b) each are a view showing a process of installing the power plant.

FIGS. 10(a) and (b) each are a view for explaining an installation process of the power plant. After the power plant having made into a plurality of packages are transported to the installation site by a plurality of trailers as shown in FIG. 6, first, the common base 6 is installed on the ground.

Figure 11A:
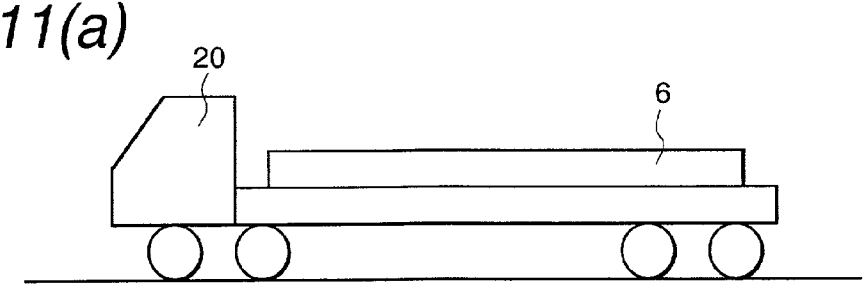
FIGS. 11(a) to 11(e) each are a view showing a process of installing the common base.
Figure 11B:
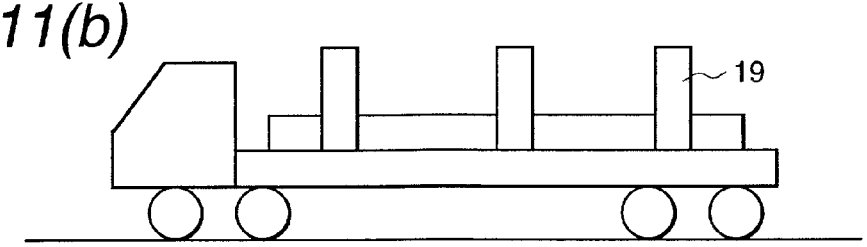
Figure 11C:
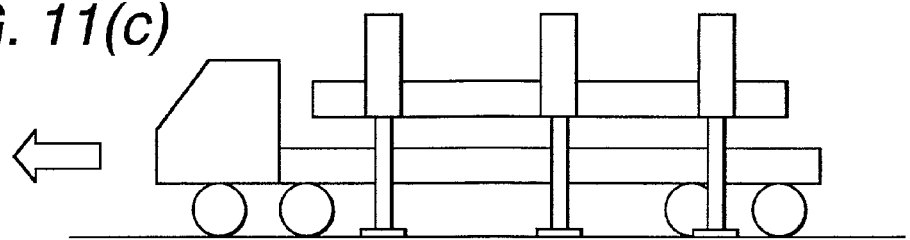
Figure 11D:
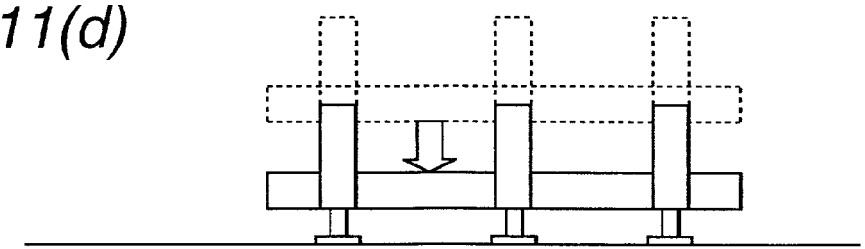
Figure 11E:
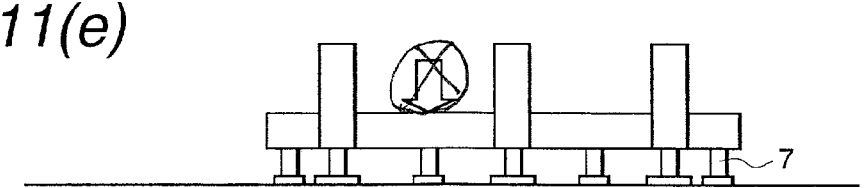

Next, an installation process of the common base 6 will be explained, referring to FIGS. 11(a) to 11(e). First, as shown in FIG. 11(a), a trailer 20 which transports the common base 6 is carried to the installation site, jacks 19 for installation are mounted on the common base 6 as shown in FIG. 11(b). Next, as shown in FIG. 11(c), the installation jacks 19 extend to the ground and float the common base 6 over the trailer 20 by further extending the jacks. After making a condition that a load is not applied on the trailer 20, the trailer 20 is moved to leave only the common base 6 as shown in FIG. 11(d). The installation jacks 19 are shortened and the common base is lowered to a predetermined height from the ground. As shown in FIG. 11(e), the landing gears 7 are mounted on the common base 6 and support the common base 6, and then the installation jacks 19 are taken off.

By conducting the process as explained above, the common base 6 can be easily installed without using any other apparatuses such as a crane. Further it is possible to jointly use the landing gears 7 as jacks 19 at time of installation without using the installation jacks 19. Further, it is possible to mount the installation jacks 19 and landing gears 7 on the common base 6 when transported, and when they becomes a bar to transportation, they can be mounted on the common base 6 at the site.

Next, an installation process of the power plant will be explained, referring to FIGS. 10(a) and (10(b). After the common base 6 is installed as mentioned above, in the present embodiment, a tailer 21 on which the gas turbine package 2 is mounted is put at a side of the common base 6. Next, by using the slide provided on a common base installation surface of the gas turbine package 2, the gas turbine package 2 is mounted on the common base 6. In the present embodiment, by this slide, it is possible to easily mount the common base 6 without using a large-scaled apparatus such as a crane or the like.

Figure 10B:
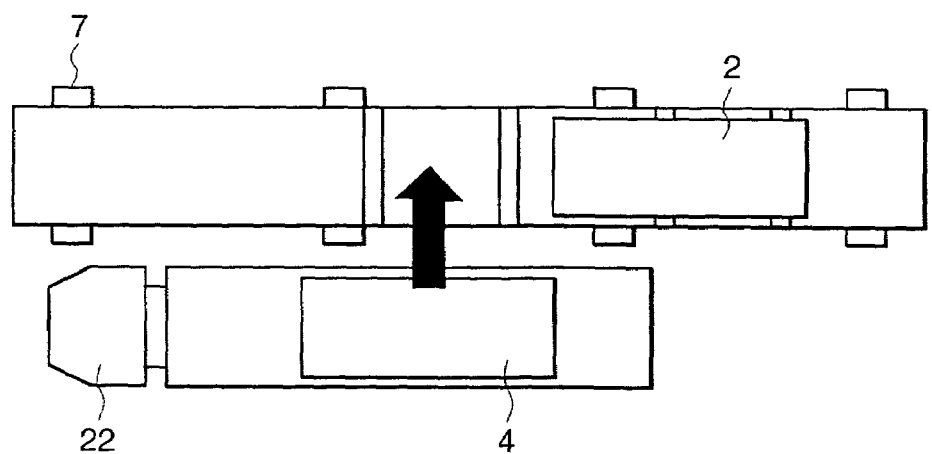

After the gas turbine 2 is fixed to the common base 6, a generator transportation trailer 22 is put at a side of the common base 6 as shown in FIG. 10(b) and the generator 4 is slid onto the common base 6 in the same manner as in the gas turbine 2. If there is other generator or generators, they are mounted onto the common base 6 and fixed as shown in FIGS. 10(a) and 10(b). Further, in the above explanation, an example that the generator is mounted onto the common base 6 next to the gas turbine package, however, the mounting order can be determined freely.

Since a surface of the common base 6 on which the power plant is mounted is finished by machining, it is possible to install the power generation apparatuses with precise positional relation between the power generation apparatuses on the common base 6.

Further, since the common base 6 is supported by the landing gears 7 each length of which is variable, it is possible to freely adjust the height of the common base 6 to the height of the bed of a transportation trailer when the power plant is moved from the transportation trailer to the common base 6.

Hereunder, an example of a concrete construction of the sliding mechanism will be explained.

Figure 12:
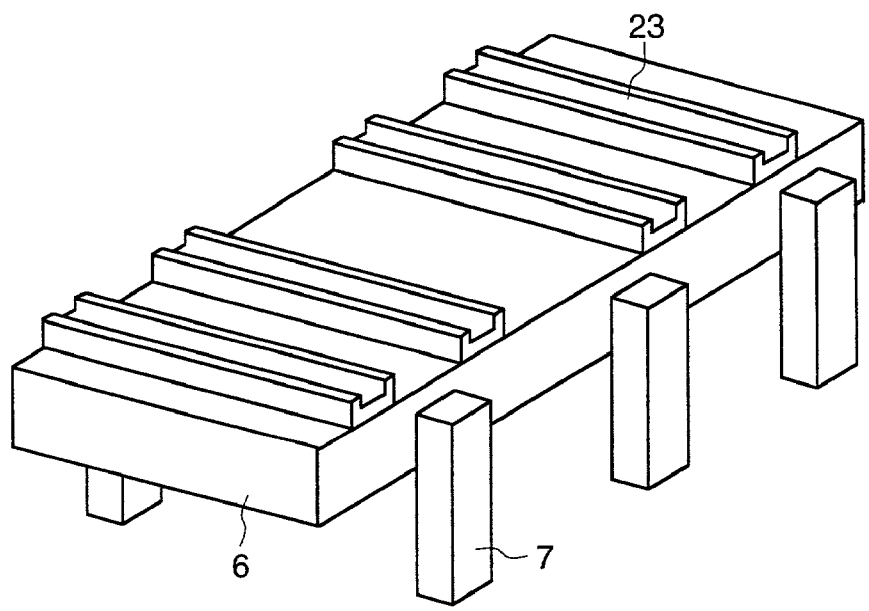
FIG. 12 is a perspective view of a sliding apparatus mounted on the common base.
Figure 13:
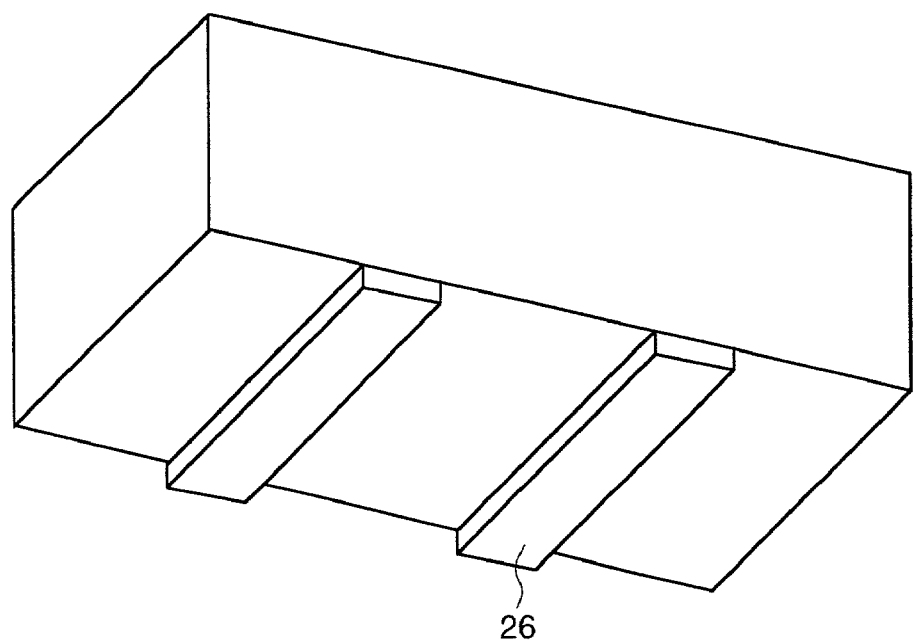
FIG. 13 is a perspective view of a power plant package provided with a slide for sliding on the common base in the width direction.

FIG. 12 shows a sliding apparatus mounted on the common base 6. As shown in FIG. 12, width-wise rails 23 extending in a width direction of the common base 6 are provided on the common base 6. The width-wise rails 23 are formed so that packages of individual divided power generation apparatuses can be guided in the width direction of the common plate 6 when they are mounted on the common base 6, and in FIG. 12, as an example thereof, the width-wise rails in which concave portions are formed on a mounting surface are illustrated.

On one hand, a width-wise slide 26 extending in a width direction of the common base 6, for example, a convex mechanism which is able to be fitted in the concave portions of the width-wise rail 23, is provided on a common base installing surface of the power plant to be set on the common base 6. By positioning the width-wise slide 26 and the width-wise rails 23, the gas turbine 2 is moved along the width-wise rails 23. After the gas turbine 2 has been moved onto the common base 6, the gas turbine package transportation trailer 21 is moved away from the side of the common base 6. The gas turbine package 2 on the common base 6 is positioned with respect to the common base, for example, by positioning it to a reference point of the common base 6, and then it is fixed to the common base 6. The gas turbine 2 moves on the width-wise rails 23 precisely mounted on the common base 6, so that the gas turbine 2 can be set at a precise position on the common base 6 without specific adjustment.

Further, when the power plant has become unnecessary, it can be easily removed by a process reverse to the installation process, and further, by moving it to another site and installing it, it can be reused as a power plant. Since the concrete foundation frame, and so on are not left at the place in which the power plant was removed, the place can be used for another object soon.

Further, in the case where a unit of a part of the power plant on the common base 6 is in disorder, the trailer which is empty is put at the side of the unit in disorder, and the unit is put on the trailer in a reverse process to the installation process and removed away. Then, a trailer mounting thereon a unit to be replaced thereby is put at the side of the common base 6 and the unit to be replaced is slid onto the common base 6, whereby the unit in disorder can be easily exchanged.

As explained above, in the present embodiment, the common base is used as a frame mounting thereon the power plant, so that it is possible, without practicing a conventional concrete foundation frame, to bring the frame itself in the setting site together with the other power generation apparatuses soon when the power plant becomes necessary, and it is possible to reduce greatly a term of works and a cost.

Further, hitherto, it was general to use a large-sized crane when a power plant such as a gas turbine, a steam turbine, a generator, and so on were installed on a concrete foundation frame after the frame was formed and there was a problem that the term of work and cost increased. On the contrary, in the present embodiment, since the sliding mechanism is used, it is possible to install the power plant on the common base which is a foundation frame without using a specific apparatus such as a large-scaled crane. Further, by using the sliding mechanism, the power plant can be easily moved to another site and exchange of unit or units when it is in disorder can be easily effected.

Further, the common base can be freely transported by a means of transportation such as a trailer, and installation and removal also can be easily carried out, so that after installation is done once, it is possible to easily move it to another site.

According to the present invention, there is an effect that it is possible to provide a power plant that an installation process at the site is simplified and the movement of an installed power plant is easily carried out.

What is claimed is:

1. A turbine power plant comprising:
    power generation apparatuses divided into a turbine package, a generator package, a reduction gear package and a starting apparatus package, and constructed so as to be connectable to each other through a rotating shaft;
    a common base mounting thereon each of said power generation apparatuses divided into said packages and constructed so that it is used both as a part of a transportation vehicle and as a support frame of said turbine power plant;
    a height-adjusting apparatus adjusting the height of said common base and supporting said common base; and
    wherein said common base is constructed so as to be detachable from a driving portion and wheel portion of said transportation vehicle.

2. A turbine power plant comprising power generation apparatuses divided into a plurality of modules, a common base for mounting thereon said power generation apparatuses, and a support device for supporting said common base, characterized in that
    said common base is constructed so that it is used both as a part of a transportation vehicle transporting said common base and as a support frame of said power plant; and said common base is provided with a lengthwise sliding mechanism for moving said power generation apparatuses mounted on said common base in a lengthwise direction of said common base.

3. A turbine power plant comprising power generation apparatuses divided into a plurality of modules, a common base for mounting thereon said power generation apparatuses, and a support device for supporting said common base, characterized in that
    said common base is constructed so that it is used both as a part of a transportation vehicle transporting said common base and as a support frame of said power plant and
    said common base is provided with a width-wise sliding mechanism for moving said power generation apparatuses mounted on said common base in a width direction of said common base from a side position along the length direction of said common base.

4. An installation process of power generation apparatuses divided into a plurality of modules, comprising the steps of:
    installing a common base formed so as to be used both as a part of a first transportation vehicle and a support frame of a power plant at an installation site of the power generation apparatuses;
    arranging a second transportation vehicle mounting thereon the power generation apparatuses to be installed on the common base at a position adjacent to the common base;
    sliding the power generation apparatuses mounted on the transportation vehicle in a width direction of the common base and installing the power generation apparatuses on the common base; and
    connecting the power generation apparatuses of a plurality of modules mounted on the common base with each other through a rotating shaft.

5. A process of removing power generation apparatuses divided into a plurality of modules, comprising the steps of:
    arranging a transportation vehicle to mount thereon the divided power generation apparatuses at a position adjacent to a common base installed at an installation site and used both as a part of another transportation vehicle and a support frame of the power plant;
    sliding the power generation apparatuses installed on the common base in a width direction of the common base to move it onto the another transportation vehicle arranged adjacent to the common base; and
    connecting the common base, from which all or a part of the divided power generation apparatuses are mounted on the transportation vehicle, to another transportation vehicle different from said transportation vehicle for transporting said divided power plant, thereby transporting the common base.

* * * * *